E. J. DILLMAN 2,466,582

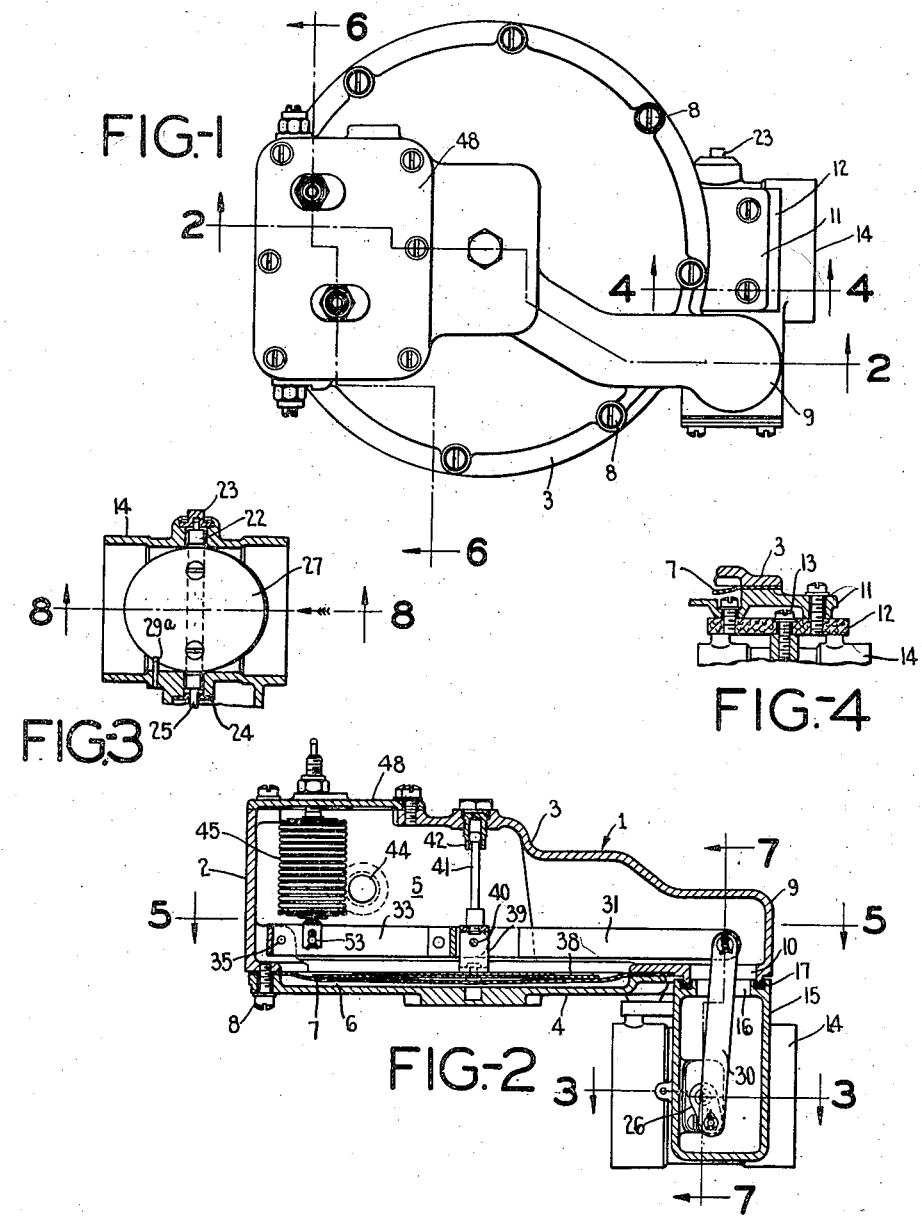

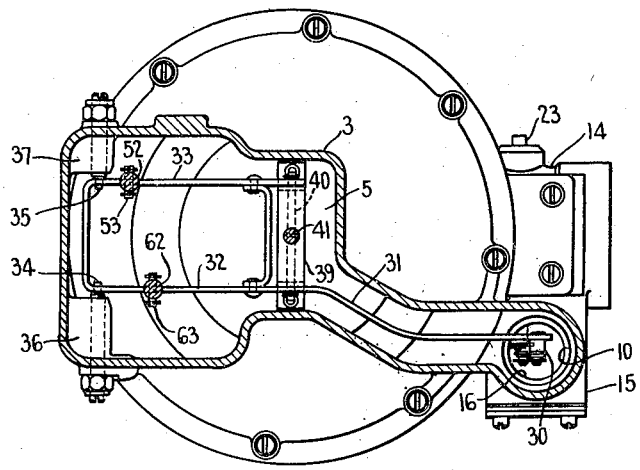
FIG.-5
FIG.-9
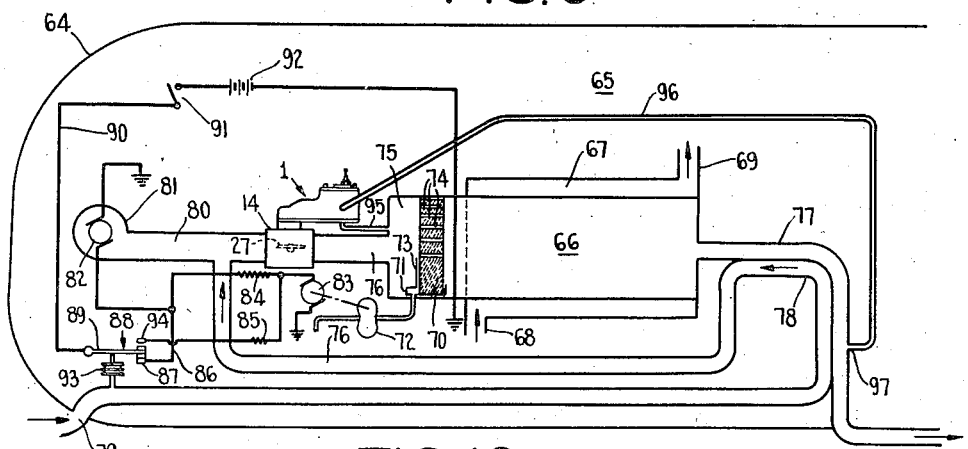
FIG.-16
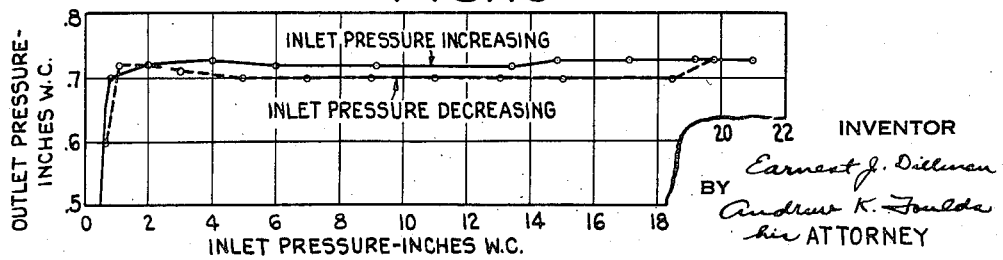

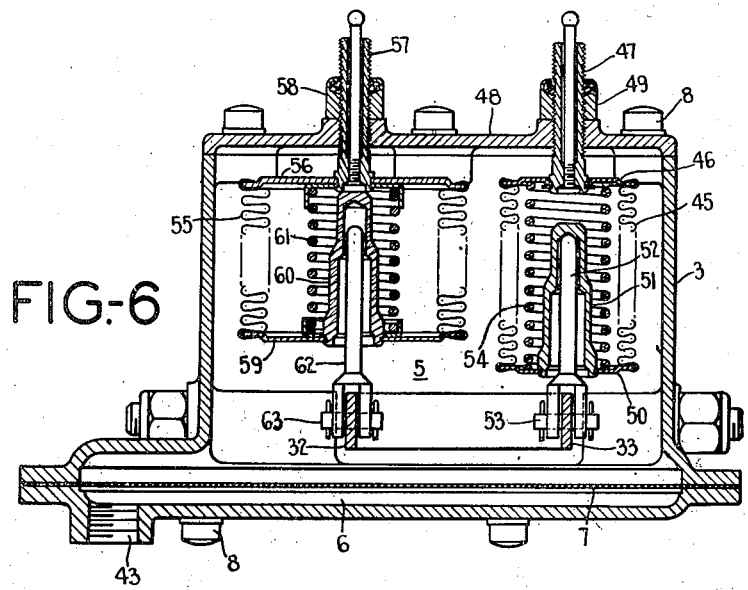
FIG.-6
FIG.-10
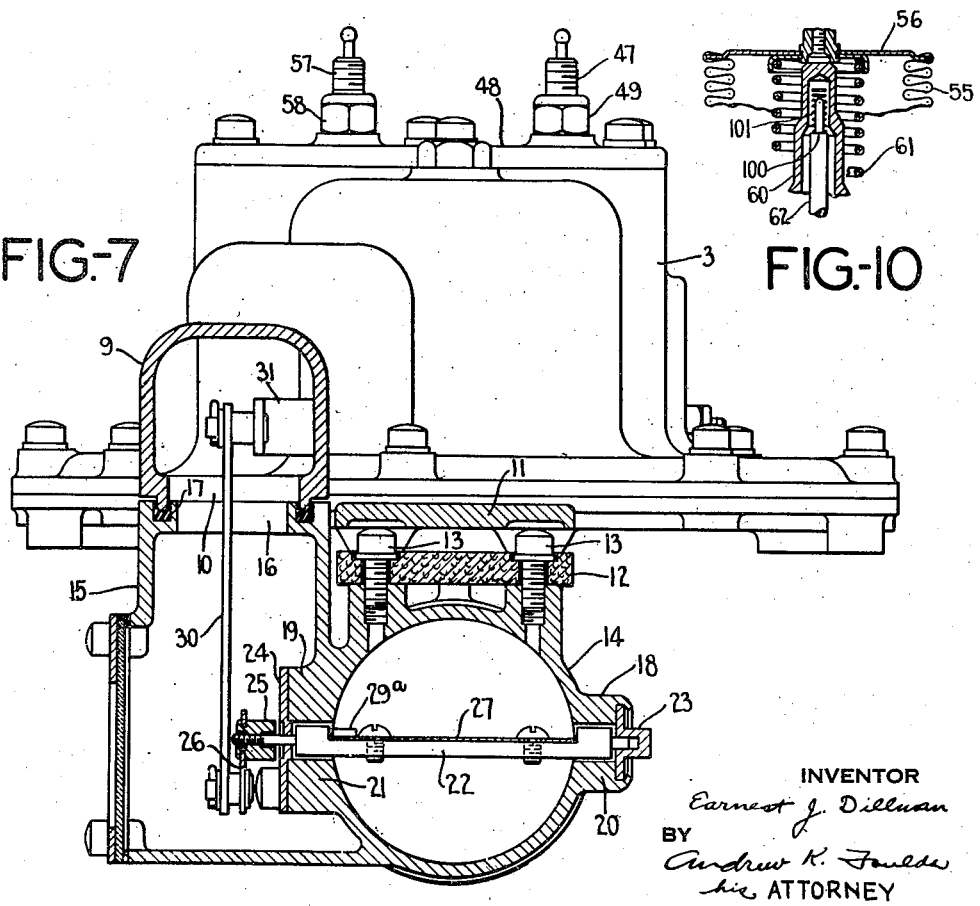
FIG.-7
INVENTOR
Earnest J. Dillman
BY
Andrew K. Foulds
his ATTORNEY April 5, 1949.
E. J. DILLMAN
2,466,582
SPEED AND ALTITUDE RESPONSIVE
CONTROL FOR AIRCRAFT HEATERS
Filed Sept. 27, 1943
5 Sheets-Sheet 4
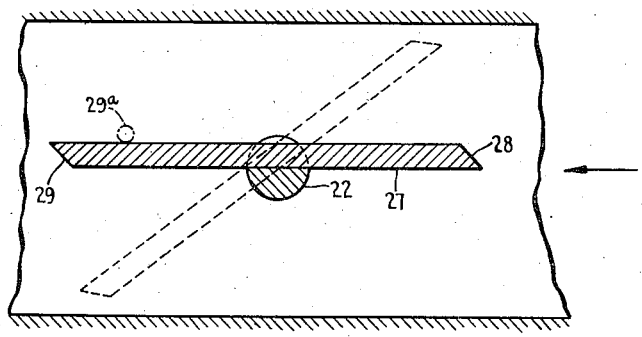
FIG-8
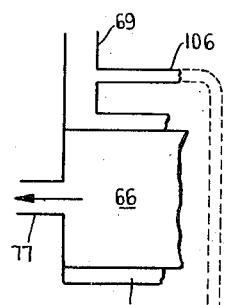
FIG-11
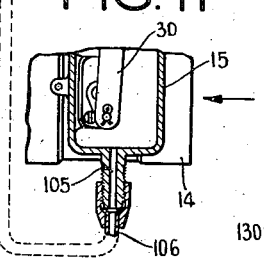
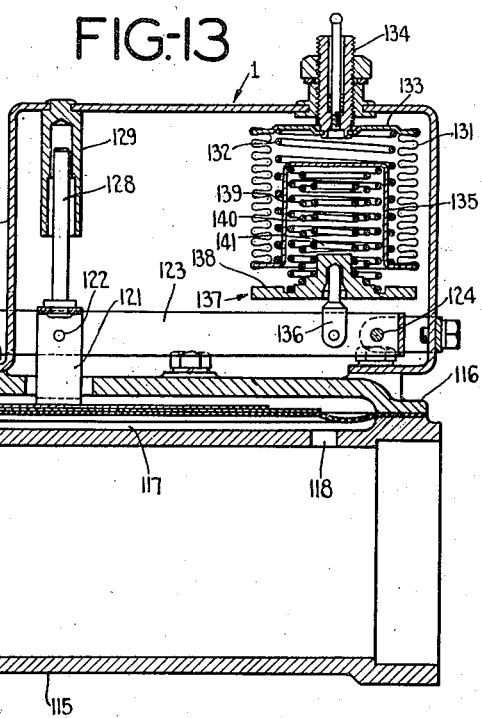
FIG-13
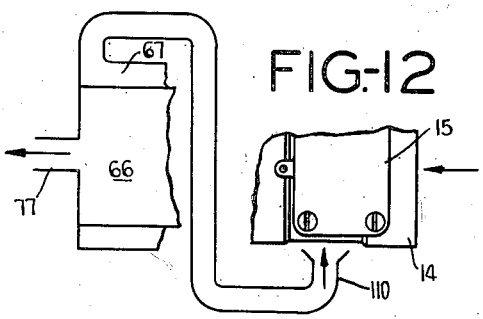
FIG-12
INVENTOR
Earnest J. Dillman
BY
Andrew K. Fouds
his ATTORNEY April 5, 1949.

SPEED AND ALTITUDE RESPONSIVE
CONTROL FOR AIRCRAFT HEATERS

Filed Sept. 27, 1943

INVENTOR
Earnest J. Dillman
BY
Andrew K. Foulds
his ATTORNEY

Patented Apr. 5, 1949

2,466,582

UNITED STATES PATENT OFFICE 2,466,582

SPEED AND ALTITUDE RESPONSIVE CONTROL FOR AIRCRAFT HEATERS

Earnest J. Dillman, Detroit, Mich., assignor to Detroit Lubricator Company, Detroit, Mich., a corporation of Michigan Application September 27, 1943, Serial No. 503,883

21 Claims. (Cl. 126—116)

This invention relates to new and useful improvements in heating apparatus and more particularly to a method and apparatus or device for controlling the combustible mixture to be supplied to the combustion chamber of the heating apparatus.

An object of the invention is to provide a method of maintaining a substantially constant heat output of aircraft carried heating apparatus.

Another object is to provide means for maintaining the weight of combustion supporting air in accordance with the weight of fuel supplied to the combustion chamber, irrespective of any substantial change in barometric pressure.

Another object is to provide means to maintain the weight of the air supplied to the combustion chamber from the exterior of the aircraft substantially constant per unit of time, irrespective of change in aircraft speed.

Another object is to provide means to heat the combustion supporting air so that the weight of the supplied air will be substantially unaffected by change in atmospheric temperature external of the aircraft.

In addition to the foregoing objects, other objects will be apparent from the following specification.

The invention consists in the novel method and the novel apparatus and cooperative relation of parts to be more fully described hereinafter and the novelty of which will be particularly pointed out and distinctly claimed.

In the accompanying drawings, to be taken as a part of this specification, there are fully and clearly illustrated several preferred embodiments of the invention and certain modifications of the same, in which drawings—

Figure 1 is a top plan view of a control device or apparatus for regulating the combustion supporting air and embodying the invention;

Fig. 2 is a view in section on the line 2—2 of Fig. 1;

Fig. 3 is a view in section on the line 3—3 of Fig. 2;

Fig. 4 is a detail view in section on the line 4—4 of Fig. 1;

Fig. 5 is a view in section on the line 5—5 of Fig. 2;

Fig. 6 is a view in section on the line 6—6 of Fig. 1;

Fig. 7 is a view in section on the line 7—7 of Fig. 2;

Fig. 8 is an enlarged detail view in section on the line 8—8 of Fig. 3;

Fig. 9 is a diagrammatic view of an aircraft carried heating apparatus having the control device of Figs. 1 to 8 operatively connected thereto;

Fig. 10 is a detail view in section of a portion of the device of Fig. 6 and showing a modification for accomplishing a closer control of the weight of combustion air throughout the complete range of aircraft altitudes;

Fig. 11 is a detail view partly in section and partly diagrammatic showing means for heating certain of the operating mechanism of the control device;

Fig. 12 is a detail view partly diagrammatic and showing another way of heating the control device;

Fig. 13 is a view in vertical central section of a control device similar to that of Figs. 1 to 8 but accomplishing the novel method of air control by means of a single barometric pressure responsive element;

Fig. 16 is a chart showing graphically the operation of the control devices at a given or constant aircraft altitude.

Figure 14:
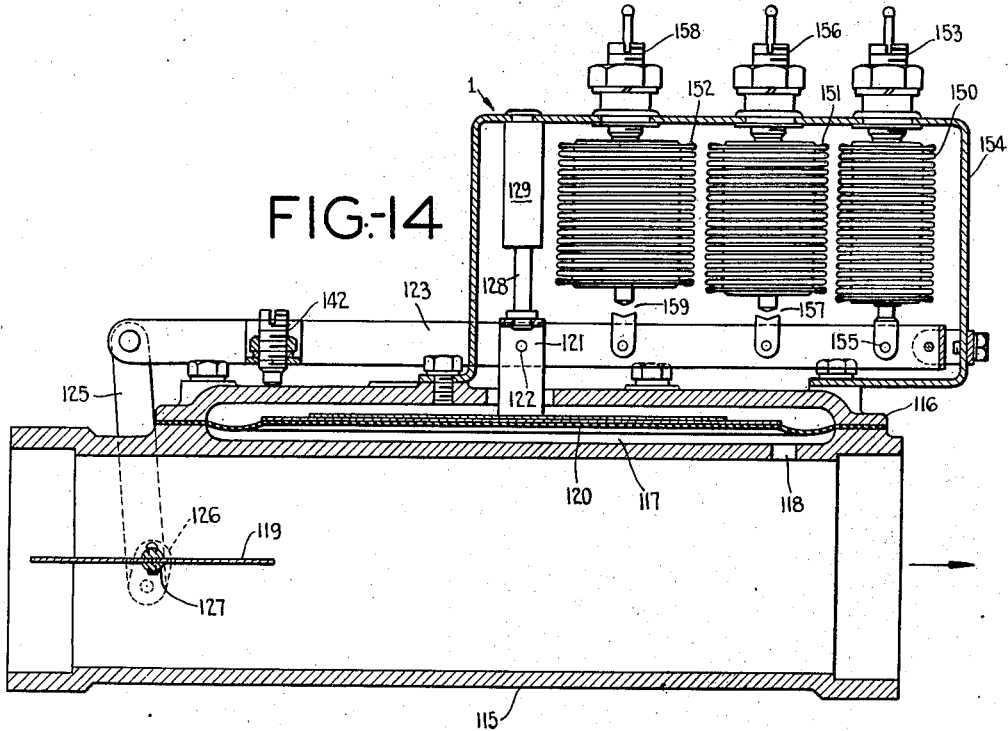
Fig. 14 is a view in vertical central section of another form of control device for performing the method of this invention but which functions to maintain the weight of supplied air more nearly at the theoretical value throughout the range of aircraft altitudes.

Referring to the drawings by characters of reference in Figs. 1 to 9, the numeral 1 designates a control device having a casing 2 with top and bottom hollow members 3, 4 providing chambers 5, 6 respectively separated by a pressure sensitive member or diaphragm 7, preferably of a cloth and rubber composition which is clamped and sealed at its periphery between the members 3 and 4 by studs or bolts 8 which also clamp these top and bottom members together. The top member 3 has a hollow extension 9 projecting beyond the periphery of the diaphragm 7 and the member 4 and which has a downward facing opening 10. Extending from the periphery of the bottom member 4 at one side of the extension 9 there is a plate like supporting shelf 11, see Figs. 4 and 7. Secured to the under side of the shelf 11 and of the bottom member 4 there is a pad or plate 12 of heat insulating material to the under face of which there is clamped by a pair of screws 13 an airflow conduit member or tubular valve casing 14 which carries at one side and beneath the extension 9, a casing portion 15 having an upwardly opening aperture 16 registering with the opening 10. The joint between the casing member 3 and the portion 15 is sealed around the registering apertures 10 and 16 by a gasket 17.

The conduit member 14 has opposite horizontally positioned shaft receiving bosses 18, 19, the boss 19 extending into the casing portion 15. Through the bosses 18, 19 there are horizontal aligned apertures 20, 21 respectively into which extend the opposite ends of a valve supporting shaft 22 having its end portions of reduced diameter and journaled in supporting plates 23, 24 carried by the bosses 18, 19 respectively. The plate 23 is in a form of a cap member such as to seal the shaft aperture 20. The end portion 25 which extends through the bearing plate 24 projects into the casing portion 15 and has rigidly fixed thereon a crank arm 26. Between the opposite internal walls of the conduit member 14, the shaft 22 is of semi-circular cross section and has clamped to its flat diametral face an air flow controlling valve 27 of the butterfly type. The valve 27 is of oval outline so that it will conform to and close off flow through the conduit member 14 with less than 90° rotation. The leading and trailing end edges of the valve 27 are bevelled, as at 28, 29 respectively, so that the periphery of the valve will fit the internal wall of the conduit member 14 when the valve member is closed. This arrangement of the valve 27 results in the air pressure exerting a slightly unbalanced closing force so as to compensate somewhat for variations in air pressure. The valve 27 is restrained against movement beyond full open position by a stop member or pin 29ᵃ which extends into the conduit 14 for engagement by the valve 27.

Pivotally secured to the free end of the arm 26 which extends downward from the shaft 22, there is a link or thrust member 30. The angle of the arm 26 is such that, with the valve 27 in horizontal wide open position, it has a decelerated movement toward closed position for equal increments of upward movement of the link 30. Also the link 30 acts through an increasing lever arm as the valve moves toward closed position, so that with a constant upward force on the link 30 an increasing closing force will be exerted on the valve 27. The link 30 extends upward through the apertures 16 and 10 and has its free end pivotally secured to an actuating lever 31 which is positioned within the chamber 5 and extends across the diaphragm 7. The end portion of the lever 31 within the chamber 5 and overlying the center of the diaphragm 7 is a substantially rectangular framework having side frame members 32, 33 rigidly joined together and fulcrumed on aligned inwardly extending bearing pins 34, 35 respectively which are adjustably supported in bosses 36, 37 carried by the top member 3. The bearing pins 34, 35 are preferably shouldered to accurately locate the lever 31 transversely of the casing. The diaphragm 7 has a reinforcing and supporting plate 38 to which is secured an inverted U-shaped bracket 39 extending transverse to the lever members 32, 33 and across the mid-point of the diaphragm 7. The side members of the bracket 39 fit between the frame members 32, 33. The bracket 39 is pivotally secured to the lever 31 by means of a shaft or pivot pin 40 extending through aligned apertures in the frame members 32, 33 and the side members of the bracket 39. Secured to the cross member or base of the bracket 39 there is a guide rod 41 extending upwardly and having a ball type end slidably guided and fitting within a cylindrical recess in a guide member 42 projecting inward and downward from the top wall of the top member 3. Through the bottom wall of the bottom member 4 there is a port or aperture 43, see Fig. 6, for connecting the chamber 6 to a source of operating pressure for the diaphragm 7 and which will be described hereinafter. Through the side wall of the top member 3 there is a port or aperture 44, see Fig 2, for connection to a source of pressure to act on the top face of the diaphragm 7 for a purpose to be described.

Overlying the lever member 33 there is an expansible-contractible hollow member 45 such as a metal bellows which is evacuated of air and hermetically sealed. The bellows upper end wall or head 46 has a supporting stem or rod 47 adjustably screw threaded through a cover plate 48 closing and sealing a top wall aperture in the top member 3. A lock nut 49 containing a packing material clamps the stem 47 in position and seals the aperture through the member 48. The lower bellows end or head 50 carries a tubular guide and socket member 51 which extends upward into the bellows 45. Seating against the upper inner end wall of the guide member 51 there is a force transmitting post or thrust member 52 which is slotted at its lower end to straddle the lever member 33 to which the thrust member 52 is pivotally secured by a bearing pin 53. Within the bellows 45 there is a helical coil spring 54 which is held under compression between the bellows heads 46 and 50 and which exerts a force relative to the area of the bellows heads such that it acts to expand the bellows 45, tending to move the head 50 downward as the pressure in chamber 5 surrounding the bellows 45 decreases. Overlying the lever member 32 there is an expansible contractible hollow member 55, such as a metal bellows, which is evacuated of air and hermetically sealed. The bellows 55 is of larger diameter than the bellows 45 in order to render it more sensitive to lower barometric pressures or higher altitudes. The upper end wall or head 56 of bellows 55 carries a stem or supporting rod 57 which is adjustably screw threaded through an aperture in the cover member 48 and which is locked in adjusted position by a combined sealing and lock nut 58. The lower end wall or head 59 of bellows 55 carries a combined guide and thrust transmitting socket member 60 which extends upward into the bellows 55 and has its upper end cooperable with the head 56 to limit contraction of the bellows 55. Surrounding the member 60 and held under compression between the heads 56 and 59 there is a helical coil spring 61 which, upon decrease of air pressure in chamber 5 and around the bellows 55, serves to expand the bellows and move the head 59 downward. The socket member 60 receives a post or thrust member 62 which has its upper end engageable by the end wall of the socket member 60 to transmit downward force and movement of the spring 61 to the lever member 32, the lower end of the thrust member 62 being slotted to straddle the member 32 and being pivotally secured thereto by a bearing pin 63. The bellows 45 and 55 are positioned between the diaphragm connection to the lever 31 and its fulcrum, the bellows 45 being positioned to act on the lever 31 more closely to its fulcrum than the bellows 55, the relative positions being shown in Fig. 5.

Figure 15:
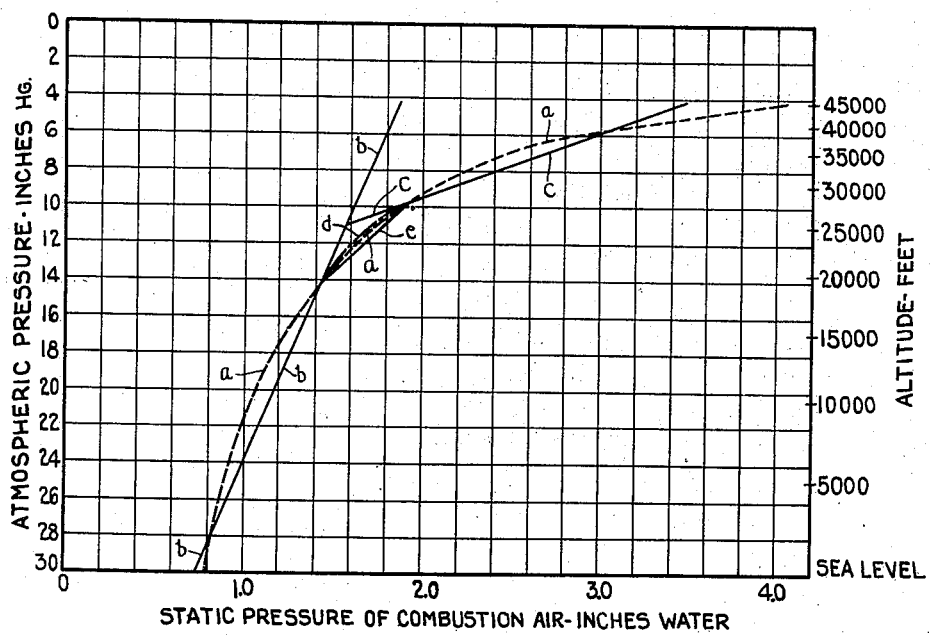
Fig. 15 is a chart showing graphically the operation of certain of the foregoing control devices.

Referring to Fig. 9, 64 designates the fuselage or a body portion of an aircraft having a space 65 therein to be heated. Either within this space 65 or in a separate space there is a heating apparatus having a combustion chamber 66 with a surrounding air heating chamber 67 which has an inlet duct 68 for air to be heated and an outlet duct 69 for delivery of the heated air to the space 65. The combustion chamber 66 is supplied with a combustible mixture of air and fuel by a mixing member 70 which is preferably a baffle of ceramic or other porous material capable of capillary action. The member 70 has its lower end portion positioned in a fuel cup or chamber 71 which is supplied with liquid fuel from a tank or the like (not shown) by a pump 72 having high and low rates of fuel feed. The member 70 has its lower half shielded by a partition or baffle 73 and has a plurality of air flow ports or orifices 74 through its upper half or portion. The member 70 and baffle 73 form the combustion chamber wall of a static air pressure or plenum chamber 75 which is supplied with combustion supporting air through a conduit or duct 76. The combustion chamber 66 has an outlet conduit or duct 77 leading to the exterior of the aircraft for discharging the products of combustion to atmosphere from the chamber 66. The conduit 76 preferably has a portion 78 which extends in heat exchange relation with the outlet duct 77, the inlet to the conduit 76 opening to the exterior of the aircraft and having an inlet, as at 79, so that atmospheric air is supplied to the conduit 76 and chamber 75 by the movement of the aircraft in flight. The conduit 76 is also supplied with air from a branch conduit 80 connected to the outlet of a fan or blower 81 driven by an electric motor 82 and which supplies air to the chamber 75 when the aircraft is not in flight or its air speed is below a predetermined minimum. The pump 72 is driven by an electric motor 83 supplied with current through a low speed resistance 84 or a high speed resistance 85. The resistance 84 is connected in parallel circuit with the blower motor 82 from a common lead wire 86 connected to one pole 87 of a double throw switch 88. The switch arm 89 of the switch 88 normally engages the contact or pole 87 and is connected by a lead wire 90 to a control switch 91 in the lead wire from the current supply source 92 such as a battery, for the motors 82 and 83. The switch 88 is controlled by the air pressure in the conduit 76 and has a pressure sensitive operating member 93 which, upon predetermined conduit air pressure moves the switch arm 89 out of contact with the pole 87 and into engagement with a contact or pole 94 which is electrically connected to the high speed resistor 85. Intercalated in the conduit 76 adjacent the chamber 75 is the conduit member 14 such that the valve 27 controls the air pressure in the chamber 75. The inlet port 43 of chamber 6 is connected by a duct or pipe 95 to the chamber 75 so that the diaphragm 7 is subjected on its under side to the pressure in chamber 75 and in the conduit 76 on the outlet side or posterior to the valve 27. The port 44 which opens into the chamber 5 is connected by a duct or pipe 96 to the combustion chamber outlet duct 77, as at 97. The operation of the control device 1 of Figs. 1 to 8 and the method of control accomplished thereby is as follows:

The bellows 45 is adjusted by the supporting member 47 so that at a known barometer reading with the aircraft on the ground, the static pressure in the plenum chamber 75 will be at the desired value to provide, with the pressure drop through the orifices 74, the desired ratio of air to fuel in the combustion chamber 66 for efficient combustion when the pump 72 is delivering fuel to the container 71 at its high constant speed operation. Referring to Fig. 15 the dotted line curve designated $a$ shows graphically throughout the range of present aircraft altitudes the theoretically desired air pressure in chamber 75 to maintain a constant weight of air flow through orifices 74 per unit of time in order to maintain for all aircraft altitudes the desired fuel air ratio for efficient combustion and to maintain a substantially constant heat output by the heating apparatus. The member 70 functions automatically with the maintenance of a constant liquid level in or rate of supply to the container 71 to supply fuel at a substantially constant rate to the air passing through the orifices 74. Referring again to Fig. 15 it will be noted that the bellows 45 is adjusted so that the spring 54 will, at sea level, position the valve 27 to provide in the chamber 75 a static pressure of about seven and one-half tenths (.75) inch of water, as indicated by the full line curve designated $b$, the bellows area, the force of spring 54, and the lever mechanism which operates valve 27 being so proportioned as to move the valve 27 to provide in chamber 75 the static pressures shown by this curve $b$ at any constant aircraft air speed. The curve $b$ closely approximates the theoretical curve $a$ up to an altitude of about 25,000 feet above sea level and throughout this range of altitudes the bellows 45 controls the valve 27. The bellows 55 is adjusted by stem 57 so that when the pressure in chamber 5 decreases to about eleven (11) inches of mercury, corresponding to 25,000 feet altitude, the end wall of member 60 will engage the thrust member 62 under the force of spring 61 and for any further increase in aircraft altitude the spring 61 will act upon the lever 31 to move the valve 27 toward open position in conjunction with the force of the spring 54 so that the static pressure in the chamber 75 will be held on the curve $c$ of Fig. 15, in order to maintain the weight of air supplied to the combustion chamber 66 substantially constant.

Assuming now that the aircraft is on the ground and it is desired to supply heat to the space 65, the switch 91 is closed, which will place the blower 81 in operation and also the pump 72 at its low speed. Any suitable means may be employed to ignite the combustible mixture discharging into the combustion chamber 66. The pressure created by the blower 81 is insufficient to operate the valve 27 which will remain in its wide open position. As the aircraft takes off and gathers speed, pressure will build up in the conduit 76 and when a predetermined air speed is reached such that an increase in fuel should be provided and can be burned efficiently with the additional air due to the increased speed, then the pressure switch 88 will be actuated to break circuit at contact 87 and to make circuit at contact 94, thus cutting out the blower 81 and supplying the pump motor 83 with current through the high speed resistance 85. This air pressure in conduit 76 at which switch 88 is actuated to stop the blower 81 is the pressure at which the diaphragm 7 will throttle the valve 27 to maintain the pressure in the chamber 75 substantially constant irrespective of change in the air speed of the aircraft for any given aircraft altitude. In Fig. 16 the operation of valve 27 by the diaphragm 7 is graphically shown for low altitude flight corresponding to about 29.7 inches of mercury. The static pressure in chambers 75 and 6 acting on the under side of the diaphragm will more accurately throttle the valve 27 if the pressure in chamber 5 acting on the top face of the diaphragm 7 is varied in accordance with or is the pressure existing in the combustion chamber outlet duct 77, which pressure is conveyed to the chamber 5 through the duct 96. This is by reason of variation in the pressure drop across orifice member 70 due to the effect of air flow on the discharge or outlet of duct 77. As the aircraft gains in altitude, the bellows 45 will expand due to the decrease in pressure in chamber 5 and spring 54 will act through the lever mechanism on valve 27 to urge the valve toward open position against the force of the air pressure in chamber 6 on diaphragm 7. These counteracting forces of spring 54 and diaphragm 7 will maintain the static pressure in the plenum chamber 75 on the line $b$ of Fig. 15. When the aircraft has reached an altitude of about 25,000 feet, then the bellows head member 60 will engage the thrust member 62 and the spring 61 will act with the spring 54 in opposition to the pressure in chamber 6 to throttle the valve 27 to maintain the static pressure in chamber 75 on the curve $c$ of Fig. 15.

Referring to Fig. 10 the thrust member 62 is provided with a shoulder 100 on which is supported a helical coil compression spring 101 which, when inert, has its free end spaced from the end wall of the socket in bellows head member 60. This spring functions to maintain the static pressure in chamber 75 more nearly at the theoretically desired pressures of curve $a$ between aircraft altitudes of about 20,000 feet and 27,000 feet, as indicated by the dash-dot line $d$, Fig. 15. When the pressure in chamber 5 has decreased to about fourteen (14) inches of mercury, then the socket end wall in member 60 will engage the free end of spring 101, and as the pressure continues to decrease with increasing altitude, the spring 101 will be compressed, thereby exerting with an increasing force the force of spring 61 upon the thrust member 62. When the pressure in chamber 5 has decreased to about ten (10) inches of mercury, then the socket end wall of member 60 will have collapsed spring 101 sufficiently to bring the socket end wall into positive engagement with the thrust member 62 so that the operation of the spring 61 for all further increases of altitude functions as above described to maintain the static pressure in chamber 75 on the curve $c$. It will thus be noted that the modification in Fig. 10 provides for a three stage operation, accomplishing a closer control of the valve 27.

In Fig. 11 there is shown means for heating the valve operating mechanism in order to overcome a decrease in sensitivity of the parts at extremely low temperatures encountered in high altitudes. The casing portion 15 is provided with a calibrated inlet port 105 which is connected by a tube or conduit 106 to the heating chamber outlet 69 so that heated air is supplied to the chamber 5 of the control device and particularly to the casing portion 15 which is at the air inlet conduit 14.

In Fig. 12 there is shown a modification of the heating means of Fig. 11. Here the heated air is not discharged into the casing 2 but is discharged over the conduit 14 and casing portion 15 from the open end of a duct 110 which is connected to the air heating chamber 67.

In Fig. 13 there is shown another form of control device 1 in which the valve containing conduit portion to be intercalated in the conduit 76 is designated 115. The conduit portion 115 is elongated to underlie the diaphragm supporting casing 116 containing a pressure chamber 117 which is in communication with the interior of the conduit portion 115 through a port 118. Positioned in the conduit portion or member 115 ahead of or on the inlet side of the port 118 is the air flow controlling valve 119 similar to valve 27. The chamber 117 is closed and sealed by a pressure sensitive member or diaphragm 120 having a thrust member 121 similar to bracket 39 which is pivotally connected by a pin 122 to a valve operating lever 123 extending across the diaphragm 120. The lever 123 is fulcrumed on a shaft or bearing pin 124 carried by the casing 116. The free end of the lever 123 is connected by a link or thrust member 125 to a crank arm 126 rigidly secured to the valve supporting shaft 127. The thrust member 121 is guided by a guide pin 128 reciprocal in a sleeve member 129 carried by a housing 130 secured to and supported on the casing 116. Positioned in the housing 130 there is a barometric operating element 131, preferably an expansible contractible hollow member such as a metal bellows which is evacuated of air and hermetically sealed and contains a helical coil compression spring 132. The upper head or end wall 133 of the element 131 has a stem or supporting post 134 adjustably screw threaded through the top wall of the housing 130. The lower end wall or head 135 of the element 131 is in the form of an inverted cup extending upward into the element 131. The element 131 overlies the lever 123 and concentric with stem 134 there is a thrust member 136 pivotally connected to the lever 123 and extending upward therefrom. Supported on the upper end of the member 136 there is a spring supporting and abutment member 137 having its peripheral portion 138 engageable by the end wall 135. Positioned within and between the end wall 135 and the supporting member 137 there are a plurality of nested helical coil springs 139, 140 and 141 which are of different lengths. The springs 140 and 141 are of such inert length that there is movement of the head 135 against the force of spring 139 prior to engagement of the head with spring 140, and there is compression of spring 140 by the head 135 prior to engagement of the head 135 with the spring 141. The spacing of the spring 141 from the head 135 is also such that it will be compressed by the head 135 prior to engagement of the head 135 with the peripheral supporting member portion 138. Adjustable screw stop 142 is carried by the lever 123 and is cooperable with the casing 116 to limit the movement of the valve 119 to wide open horizontal position.

The operation of the control device of this Fig. 13 will be apparent from the foregoing description of Figs. 1 to 9, together with the following: The diaphragm 120 will function to control the valve 119 in the same manner as the control of valve 27 by diaphragm 7, although it will be noted that the housing 130 is open to atmosphere and therefore the compensating effect of the pressure in the discharge duct from the combustion chamber 66 is not provided, but modulation of valve 119 will be sufficiently accurate for good control of the air flow. As the aircraft gains in altitude the element 131 will expand, permitting spring 132 to act through the spring 139 against lever 123 in opposition to the pressure in diaphragm chamber 117. Springs 140 and 141 will be picked up or engaged by the head 135 as the aircraft altitude increases, thereby giving curved line changes of static pressure increase similar to the curve line d as distinguished from the straight line curves b and c. When the aircraft altitude has increased sufficiently to bring the head 135 into engagement with the supporting member portion 138, then the spring 132 will act in the same manner as spring 54 of Figs. 1 to 8 and provide a straight line curve of static pressure increase in the air supply chamber 75.

In Fig. 14 the control device shown in Fig. 13 is modified to include three barometric operating elements 150, 151 and 152 in lieu of the single element 131 of Fig. 13. The elements 150, 151 and 152 are expansible, contractible hollow members such as metal bellows which have been evacuated of air and hermetically sealed and each of which contains a helical coil compression spring similar to the elements in Figs. 1 to 8. The element 150 is carried by a supporting member or stem 153 adjustably screw threaded in the top wall of the housing 154 and is pivotally connected as at 155 to the lever 123 so that upon decrease of the atmospheric pressure the element 150 will tend to expand under the force of its contained spring acting to move the lever 123 downward and the valve 119 toward open position to maintain the static pressure in the chamber 75 on the curve b of Fig. 15. The element 151 is adjustably supported in the top wall of the housing 154 by a stem or supporting member 156 and is spaced from engagement with the lever 123 as at 157 so that it will come into play to exert force on the lever 123 in conjunction with the element 150 at say fourteen (14) inches of mercury or about 20,000 feet altitude so that the static pressure in chamber 75 will follow the curve e, Fig. 15, which more closely approximates the curve portion a between fourteen (14) inches and ten (10) inches of mercury than do the combined curves b and c. When the aircraft altitude exceeds 27,000 feet at a mercury pressure of say ten (10) inches, then the element 152, adjustably supported by the stem or supporting member 158, will have expanded to take up its lost motion, as at 159, so that its contained spring will be acting against the lever 123 in conjunction with the springs in the elements 150 and 151 and throttle the valve 119 to maintain the static pressure in the chamber 75 on the curve c. It will be apparent that, if desired, another or fourth barometric element could be provided to become effective at about six (6) inches of mercury pressure to establish a new curve conforming more accurately to the curve a than does the curve c. As the operation of the control device of Fig. 14 is otherwise the same as that of Fig. 13, it is believed that no further description of this figure is necessary to a full and complete understanding of the same.

What is claimed and is desired to be secured by Letters Patent of the United States is:

1. In an aircraft carried heating apparatus having a combustion chamber air supply duct leading to the exterior of and having its inlet directed upstream of the aircraft, a control device comprising an air flow regulating valve in the air supply duct, means responsive to aircraft speed created pressure changes in said duct on the outlet side of said valve and operatively connected to said valve to move said valve toward closed position with pressure increase, and means responsive to change in aircraft altitude and operatively connected to said valve to move said valve toward open position with increase of altitude.

2. In an aircraft carried heating apparatus having a combustion chamber outlet duct leading to the exterior of the aircraft and having a combustion chamber air supply duct leading to the exterior of and directed upstream of the aircraft, a control device comprising an air flow regulating means for the air supply duct, means responsive to the differential of aircraft speed created pressure in said supply duct on the outlet side of said regulating means and the pressure in the combustion chamber outlet duct, means operatively connecting said responsive means to said regulating means to control said regulating means to reduce the effective flow area of said duct in accordance with increase in the differential of such pressures, and means responsive to change in altitude of the aircraft and controlling said regulating means in opposition to said differential responsive means.

3. In an aircraft carried heating apparatus, means forming a combustion chamber having an outlet duct discharging exteriorly of the aircraft and having an atmospheric air inlet duct leading from the exterior of and directed upstream of the aircraft, means to supply fuel to said chamber, said inlet duct having means forming an air supply chamber discharging through one or more orifices into said combustion chamber, air flow regulating means in said duct anterior to said supply chamber, a casing having a pressure chamber, pressure sensitive means responsive to aircraft speed created air pressure in said pressure chamber, a conduit establishing communication between said pressure chamber and said supply chamber, means operatively connecting said regulating means to said sensitive means to reduce the air supply with increase in aircraft speed, means responsive to aircraft altitude, and means operatively connecting said altitude responsive means to said regulating means to increase the air supply with increase in altitude in opposition to said sensitive means.

4. In an aircraft carried heating apparatus, means forming a combustion chamber having an outlet duct discharging exteriorly of the aircraft and having an atmospheric air inlet duct leading from the exterior of and directed upstream of the aircraft, means to supply fuel to said chamber, said inlet duct having means forming an air supply chamber discharging through one or more orifices into said combustion chamber, air flow regulating means in said duct anterior to said supply chamber, a casing having a pressure chamber, pressure sensitive means having one side subject to aircraft speed created pressure in said pressure chamber, a conduit establishing communication between said pressure chamber and said supply chamber, said casing having a second pressure chamber, said sensitive means having its other side subject to pressure in said second pressure chamber, a conduit establishing communication between said second pressure chamber and said outlet duct, means operatively connecting said regulating means to said sensitive means to decrease the effective flow area of said duct as aircraft air speed increases, means responsive to aircraft altitude, and means operatively connecting said altitude responsive means to said regulating means to increase the effective flow area of said duct as aircraft altitude increases.

5. In an aircraft carried heating apparatus, means forming a combustion chamber, a casing having a pressure chamber, a pressure sensitive member responsive to aircraft speed created air pressure changes in said chamber, an air flow conduit extending from the exterior of and having its inlet directed upstream of the aircraft for supplying combustion air to the combustion chamber of the heating apparatus, a valve controlling flow through said conduit, means operatively connecting said valve to said sensitive member to move said valve toward closed position upon increase of aircraft speed created air pressure in said pressure chamber, an air pressure transmitting duct connecting said pressure chamber to said conduit on the outlet side of said valve, and means responsive to altitude changes and operatively connected to said valve to move said valve toward open position with increase in aircraft altitude.

6. In an aircraft carried heating apparatus, a casing having a pressure chamber, a pressure sensitive member responsive to aircraft speed created air pressure changes in said chamber, an air flow conduit extending from the exterior of and having its inlet directed upstream of the aircraft for supplying combustion air to the heating apparatus, a valve controlling flow through said conduit, means operatively connecting said valve to said sensitive member to move said valve toward closed position upon increase of aircraft speed created air pressure in said pressure chamber, an air pressure transmitting duct for connecting said pressure chamber to said conduit on the outlet side of said valve, means responsive to altitude changes and operatively connected to said valve to move said valve toward open position at a predetermined rate in accordance with increase in aircraft altitude throughout an initial range of altitude increase, and means responsive to altitude changes and operatively connected to said valve to move said valve toward open position at a predetermined increased rate in accordance with increase in aircraft altitude throughout a higher range of altitude increase.

7. In an aircraft carried heating apparatus having a combustion chamber and having an air supply conduit leading to said combustion chamber from the exterior of the aircraft, said conduit having its inlet directed toward the direction of aircraft travel, a control device comprising a sealed casing, a diaphragm separating the interior of said casing into two pressure chambers, a butterfly type valve in and controlling flow through said conduit, said casing having an air inlet to one of said chambers and communicating with said conduit on the outlet side of said valve to subject said diaphragm to aircraft speed created air pressure, said casing having a port opening into the other of said chambers and communicating with the outlet of the combustion chamber of the heating apparatus, lever mechanism in said other chamber and operatively connecting said diaphragm to said valve to move said valve toward closed position upon increase of aircraft speed created air pressure in said one chamber, an evacuated hermetically sealed metal bellows in said other chamber, a helical coil spring in and tending to expand said bellows, said bellows being interposed between said casing and said lever mechanism and acting on said lever mechanism upon increase of aircraft altitude to move said valve toward open position, an evacuated hermetically sealed metal bellows in said other chamber and of greater area than said first-named bellows, a helical coil spring in and tending to expand said second-named bellows, and a thrust member providing a lost-motion connection between said second-named bellows and said lever mechanism and acting upon altitude increase above a predetermined aircraft altitude to move said valve toward open position.

8. In an aircraft carried heating apparatus having a combustion chamber and having an air supply conduit leading to said combustion chamber from the exterior of the aircraft, said conduit having its inlet directed toward the direction of aircraft travel, a control device comprising a sealed casing, a diaphragm separating the interior of said casing into two pressure chambers, a butterfly type valve in and controlling flow through said conduit, said casing having an air inlet to one of said chambers and communicating with said conduit on the outlet side of said valve to subject said diaphragm to aircraft speed created air pressure, said casing having a port opening into the other of said chambers and communicating with the combustion chamber outlet of the heating apparatus, lever mechanism in said other chamber and operatively connecting said diaphragm to said valve to move said valve toward closed position upon increase of pressure in said one chamber, means to heat said lever mechanism and the bearings for said valve, an evacuated hermetically sealed metal bellows in said other chamber, a helical coil spring in and tending to expand said bellows, said bellows being interposed between said casing and said lever mechanism and acting on said lever mechanism upon increase of aircraft altitude to move said valve toward open position, an evacuated hermetically sealed metal bellows in said other chamber and of greater area than said first-named bellows, a helical coil spring in and tending to expand said second-named bellows, and a thrust member providing a lost-motion connection between said second-named bellows and said lever mechanism and acting upon altitude increase above a predetermined aircraft altitude to move said valve toward open position.

9. In an aircraft carried heating apparatus having a combustion chamber and having an air supply conduit leading to said combustion chamber from the exterior of the aircraft, said conduit having its inlet directed toward the direction of aircraft travel, a control device comprising a sealed casing, a diaphragm separating the interior of said casing into two pressure chambers, a butterfly type valve in and controlling flow through said conduit, said casing having an air inlet to one of said chambers and communicating with said conduit on the outlet side of said valve to subject said diaphragm to aircraft speed created air pressure, said casing having a port opening into the other of said chambers and communicating with the combustion chamber outlet of the heating apparatus, lever mechanism in said other chamber and operatively connecting said diphragm to said valve to move said valve toward closed position upon increase of pressure in said one chamber, a plurality of evacuated hermetically sealed expansible contractible hollow members, each of said hollow members containing a spring tending to expand its member, each of said hollow members being positioned to act on said lever mechanism, one of said hollow members being positioned adjacent the fulcrum of and acting on said lever mechanism at low altitudes, and another of said hollow members being spaced further away from the fulcrum of and being spaced from engagement with said lever mechanism so that said other hollow member engages and acts on said lever mechanism at higher altitudes, said springs tending to move said valve toward open position upon reduction of barometric pressure.

10. In an aircraft carried heating apparatus, means forming a combustion chamber, a casing, a pressure sensitive member responsive to aircraft speed created air pressure changes in said casing, a conduit extending from the exterior of and having its inlet directed upstream of the aircraft for supplying combustion supporting air to the combustion chamber of the heating apparatus, a butterfly type valve controlling flow through said conduit, lever mechanism operatively connecting said sensitive member to said valve to move said valve toward closed position upon aircraft speed created air pressure increase in said casing, said casing having an opening for connection to said conduit on the outlet side of said valve, an expansible contractible hollow member responsive to changes in barometric pressure, a spring operatively connecting said hollow member to said lever mechanism for exerting force on said lever mechanism tending to open said valve in accordance with decrease of barometric pressure, and means to connect positively said hollow member to said lever mechanism upon predetermined decrease of barometric pressure so that said hollow member acts directly upon said lever mechanism to urge said valve toward open position for all further decreases of barometric pressure.

11. In an aircraft carried heating apparatus having an air supply conduit leading from the exterior of and with its inlet directed upstream of the aircraft, a control device comprising a casing having a chamber with an open side, a pressure sensitive diaphragm sealing said open side, a butterfly type valve in said conduit, a shaft extending diametrically across said conduit and supporting said valve, said valve having its center plane offset in the direction of flow and from the longitudinal centerline of said shaft so that air pressure on said valve will tend to close said valve and compensate for variation of air pressure on said valve, said chamber having an aperture communicating with said conduit on the outlet side of said valve to subject said diaphragm to aircraft speed created air pressure, a lever carried by said casing and having a fulcrum and overlying said diaphragm, a thrust member operable to transmit movement of said diaphragm to said lever, a crank arm on said shaft extending away from said lever when said valve is in wide open position, a link connected to said lever and extending and connected beyond said shaft to said crank arm so that movement of said valve toward closed position is decelerated for equal increments of movement of said link, guide means cooperable with said thrust member, an evacuated hermetically sealed metal bellows overlying said lever, means adjustably supporting said bellows at one end, the other end of said bellows having operative positive engagement with said lever intermediate said thrust member and said fulcrum, a spring in said bellows tending to move said lever in opposition to pressure increase in said chamber upon decrease in barometric pressure, a second evacuated hermetically sealed metal bellows overlying said lever, means adjustably supporting said second bellows at one end, the other end of said second bellows being positioned for operative positive engagement with said lever intermediate said thrust member and said first-named bellows, and a spring in said second bellows and operable upon predetermined decrease of barometric pressure to expand said second bellows into positive engagement with said lever and tending thereupon to act with said first-named spring to accelerate the rate of opening movement of said valve upon continued decrease of barometric pressure.

12. In an aircraft carried heating apparatus having an air supply conduit leading from the exterior of and with its inlet directed upstream of the aircraft, a control device comprising a casing having a chamber with an open side, a pressure sensitive diaphragm sealing said open side, a butterfly type valve in said conduit, a shaft extending diametrically across said conduit and supporting said valve, said valve having its center plane offset in the direction of flow and from the longitudinal centerline of said shaft so that air pressure on said valve will tend to close said valve and compensate for variation of air pressure on said valve, said chamber having an aperture communicating with said conduit on the outlet side of said valve to subject said diaphragm to aircraft speed created air pressure, a lever carried by said casing and having a fulcrum and overlying said diaphragm, a thrust member operable to transmit movement of said diaphragm to said lever, a crank arm on said shaft extending away from said lever when said valve is in wide open position, a link connected to said lever and extending and connected beyond said shaft to said crank arm so that movement of said valve toward closed position is decelerated for equal increments of movement of said link, guide means cooperable with said thrust member, an evacuated hermetically sealed metal bellows overlying said lever, means adjustably supporting said bellows at one end, the other end of said bellows having operative positive engagement with said lever intermediate said thrust member and said fulcrum, a spring in said bellows tending to move said lever in opposition to pressure increase in said chamber upon decrease in barometric pressure, a second evacuated hermetically sealed metal bellows overlying said lever, means adjustably supporting said second bellows at one end, the other end of said second bellows being positioned for operative positive engagement with said lever intermediate said thrust member and said first-named bellows, a spring interposed between said second bellows and said lever, and a spring in said second bellows and operable upon predetermined decrease of barometric pressure to expand said second bellows against the force of said interposed spring to urge said valve toward open position against the pressure in said chamber and with an increasing compressive force of said interposed spring, said second bellows spring acting to move said second bellows into positive engagement with said lever upon a predetermined further decrease of barometric pressure and upon predetermined pressure in said chamber and tending thereupon to act with said first-named spring to accelerate the rate of opening movement of said valve upon continued decrease of barometric pressure.

13. In an aircraft carried heating apparatus, means forming an air heating chamber for supplying heated air to a point of use, means forming a combustion chamber in heat exchange relation to said heating chamber, an atmospheric air inlet duct leading to said combustion chamber from the exterior of and directed upstream of the aircraft, means to supply fuel to said combustion chamber at a substantially constant rate, said inlet duct having means forming an air supply chamber feeding said combustion chamber, an air flow regulating valve in said duct anterior to said supply chamber, a casing having a pressure chamber with an open side, a pressure sensitive diaphragm sealing said open side, a conduit establishing communication between said pressure chamber and said air supply chamber to subject said diaphragm to aircraft speed created air pressure, lever mechanism housed in said casing and operatively connecting said diaphragm to said valve to move said valve toward closed position upon aircraft speed created air pressure increase in said pressure chamber, barometric actuating means in said casing and operatively connected to said lever mechanism to move said valve toward open position upon decrease of barometric pressure, and a heated air supply duct leading from said heating chamber and discharging into said casing to heat said lever mechanism.

14. In an aircraft carried heating apparatus, means forming an air heating chamber for supplying heated air to a point of use, a combustion chamber in heat exchange relation to said heating chamber, an atmospheric air inlet duct leading to said combustion chamber from the exterior of and directed upstream of the aircraft, means to supply fuel to said combustion chamber at a substantially constant rate, said inlet duct having means forming an air supply chamber feeding said combustion chamber, an air flow regulating valve in said duct anterior to said supply chamber, a casing having a pressure chamber with an open side, a pressure sensitive diaphragm sealing said open side, a conduit establishing communication between said pressure chamber and said air supply chamber to subject said diaphragm to aircraft speed created air pressure, lever mechanism housed in said casing and operatively connecting said diaphragm to said valve to move said valve toward closed position upon aircraft speed created air pressure increase in said pressure chamber, and barometric actuating means in said casing and operatively connected to said lever mechanism to move said valve toward open position upon decrease of barometric pressure.

15. In a vehicle carried heating apparatus, means forming a combustion chamber having an air supply duct with its inlet directed toward the direction of vehicle travel and extending from the exterior of the vehicle, a butterfly type valve member in said duct, a shaft extending diametrically across said duct and supporting said valve member, said valve member having its center plane offset in the direction of flow through said duct and from the longitudinal center line of said shaft so that air pressure on said valve member will tend to close said valve member and to compensate for variation of air pressure on said valve member, means responsive to vehicle speed created air pressure in said duct on the outlet side of said valve member, and means operatively connecting said responsive means to said valve member to move said valve member toward closed position with increase in vehicle speed.

16. In an aircraft carried heating apparatus, means forming a combustion chamber having an air supply duct with its inlet leading from the exterior of the aircraft and directed toward the direction of aircraft travel and into the aircraft air stream, a valve controlling flow through said duct, means responsive to aircraft air speed, means operatively connecting said responsive means to said valve to move said valve toward closed position with increase in air speed, and barometric means operatively connected to said valve and tending to open said valve with increase in altitude and in opposition to said responsive means.

17. A control device, comprising a conduit member, a valve member pivotally supported in said conduit member and operable to regulate flow therethrough, a lever arm rigid with said valve member, a casing mounted on said conduit member, a diaphragm cooperable with a wall of said casing to form a pressure chamber, a lever pivoted on said casing and operatively connected to said arm to move said valve member, a thrust member connecting said diaphragm to said lever such that pressure increase in said chamber will urge said valve member toward closed position, means for communicatively connecting said chamber to the interior of said conduit member on the outlet side of said valve member, a plurality of sealed metal bellows supported by said casing and responsive to changes in pressure external to said chamber, said bellows being positioned on the opposite side of said lever from said diaphragm and between the lever fulcrum and said thrust member, and a thrust member operatively connecting said bellows to said lever such that increase in pressure on said bellows will urge said valve member toward closed position, said bellows individually becoming effective in successive ranges at successive predetermined reduced pressures and being positioned and arranged to urge said valve member toward open position upon external pressure reduction, said bellows acting cumulatively on said lever such that for a given increment of pressure reduction there is in each succeeding range of pressure reduction an increased increment of lever movement.

18. A control device, comprising a conduit member, a generally elliptical valve member in said conduit member and controlling flow therethrough, a shaft pivotally supporting said valve member and projecting from said conduit member, an arm rigidly secured on an external end of said shaft, a housing member enclosing said arm, a closed casing mounted on said conduit member, said casing and said housing member having registering openings, a link pivoted to said arm and extending through said openings into said casing, a lever in said casing extending transverse to said link and pivotally secured thereto, a diaphragm cooperable with an interior wall of said casing to form a pressure chamber, a thrust member connecting said diaphragm to said lever such as to move said valve member toward closed position upon pressure increase in said chamber, a plurality of bellows members in said casing positioned between a wall of said casing and said lever, said bellows members engaging said lever between the lever fulcrum and said thrust member and being positioned on the opposite side of said lever from said diaphragm, said bellows members being positioned and adjusted for sequential operation on said lever thereby to provide a predetermined variation in the force applied to said lever in opposition to said diaphragm, said casing having an opening to subject said bellows members to external pressure, and means for communicatively connecting said pressure chamber to the interior of said conduit member on the outlet side of said valve member.

19. A control device, comprising a conduit member, a generally elliptical valve member in said conduit member and controlling flow therethrough, a shaft pivotally supporting said valve member and projecting from said conduit member, an arm rigidly secured on an external end of said shaft, a housing member enclosing said arm, a closed casing mounted on said conduit member, said casing and said housing member having registering openings, a link pivoted to said arm and extending through said openings into said casing, a lever in said casing extending transverse to said link and pivotally secured thereto, a diaphragm cooperable with an interior wall of said casing to form a pressure chamber, a thrust member connecting said diaphragm to said lever such as to move said valve member toward closed position upon pressure increase in said chamber, a plurality of bellows members in said casing positioned between a wall of said casing and said lever, said bellows members engaging said lever between the lever fulcrum and said thrust member and being positioned on the opposite side of said lever from said diaphragm, said bellows members being positioned and adjusted for sequential operation on said lever thereby to provide a predetermined variation in the force applied to said lever in opposition to said diaphragm, said casing having an opening to subject said bellows members to external pressure, means for communicatively connecting said pressure chamber to the interior of said conduit member on the outlet side of said valve member, and means for heating said housing member.

20. A control device, comprising a conduit member, a butterfly type valve member in said conduit member, a shaft extending diametrically across said conduit member and supporting said valve member, said valve member having its center plane offset in the direction of flow through said conduit member and from the longitudinal centerline of said shaft so that fluid pressure on said valve member will tend to close said valve member and to compensate for variation of fluid pressure on said valve member, means responsive to variation of fluid pressure in said conduit member on the outlet side of said valve member, means operatively connecting said responsive means to said valve member such as to urge said valve member toward closed position upon pressure increase, means responsive to static pressure external of said conduit member, and means operatively connecting said last-named means to said valve member such as to urge said valve member toward open position upon decrease of static pressure.

21. In a vehicle carried heating apparatus, means forming a combustion chamber having an air supply duct with its inlet directed toward the direction of vehicle travel and extending from the exterior of the vehicle, a valve controlling flow through said duct, means responsive to vehicle speed created air pressure in said duct, means operatively connecting said responsive means to said valve to move said valve toward closed position with increase in vehicle speed, and barometric means operatively connected to said valve and tending to open said valve with increase in altitude and in opposition to said responsive means.

EARNEST J. DILLMAN.

REFERENCES CITED

The following references are of record in the file of this patent:

UNITED STATES PATENTS

| Number | Name | Date |
|---|---|---|
| Re. 16,796 | Keith | Nov. 22, 1927 |
| 154,744 | Brown | Sept. 8, 1874 |
| 306,314 | Beechey | Oct. 7, 1884 |
| 427,516 | Knickerbocker | May 6, 1890 |
| 497,295 | Acton | May 16, 1893 |
| 1,461,520 | Forman | July 10, 1923 |
| 1,551,908 | Prouty | Sept. 1, 1925 |
| 1,562,663 | Strong | Nov. 24, 1925 |
| 1,926,069 | Sutton | Sept. 12, 1933 |
| 1,958,023 | Smith | May 8, 1934 |
| 2,063,477 | Young et al. | Dec. 8, 1936 |
| 2,112,391 | Anxionnaz | Mar. 29, 1938 |
| 2,212,606 | Klinker | Aug. 27, 1940 |
| 2,264,869 | Beardsley | Dec. 2, 1941 |
| 2,270,659 | Meyn | Jan. 20, 1942 |
| 2,313,149 | Jacobson | Mar. 9, 1943 |
| 2,314,089 | Hess et al. | Mar. 16, 1943 |
| 2,364,214 | Hess et al. | Dec. 5, 1944 |
| 2,388,669 | Baker | Nov. 13, 1945 |
| 2,388,970 | Hess | Nov. 13, 1945 |
| 2,403,186 | Leslie | July 2, 1946 |
| 2,418,566 | Arnhym | Apr. 8, 1947 |

FOREIGN PATENTS

| Number | Country | Date |
|---|---|---|
| 2,316 | Great Britain | June 1, 1876 |
| 419,920 | Great Britain | Nov. 21, 1934 |
| 501,138 | Great Britain | Feb. 22, 1939 |

OTHER REFERENCES

McAdams, "Heat Transmission," second edition, McGraw-Hill Book Co., New York, 1942, chapter 5, page 119, formula 8a.